United States Patent

[11] 3,631,825

| [72] | Inventor | Heinrich Weiste |
| | | 4771 Sieningsen, Post Weslarn 23 |
| | | Utrecht Soest, Germany |
| [21] | Appl. No. | 610,873 |
| [22] | Filed | Jan. 23, 1967 |
| [45] | Patented | Jan. 4, 1972 |
| [32] | Priorities | Jan. 22, 1966 |
| [33] | | Germany |
| [31] | | W 40776; |
| | | Apr. 20, 1966, Germany, No. W 41383; |
| | | Nov. 5, 1966, Germany, No. W 42735; |
| | | Nov. 5, 1966, Germany, No. W 42736 |

[54] APPARATUS FOR DISTRIBUTING AND SPREADING MATERIAL
7 Claims, 10 Drawing Figs.

[52] U.S. Cl............................................ 111/11,
222/330, 222/373, 239/655, 239/661
[51] Int. Cl............................................... A01c 7/16
[50] Field of Search............................................ 111/11, 14,
8, 9, 10, 12, 13; 222/193, 330, 334, 373; 239/655,
661, 663, 664; 198/190; 138/39

[56] References Cited
UNITED STATES PATENTS

| 210,683 | 12/1878 | Galloway et al. | 111/9 |
| 467,683 | 1/1892 | Essex | 111/14 |
| 855,651 | 6/1907 | Milne | 138/39 |
| 1,785,945 | 12/1930 | Ezdorf et al. | 222/193 |
| 2,968,266 | 1/1961 | Gustafson | 222/193 |
| 3,306,630 | 2/1967 | Weiste | 280/479 |
| 2,001,003 | 5/1935 | Tuft | 111/73 |
| 2,141,044 | 12/1938 | Rassmann | 111/34 |
| 2,171,205 | 8/1939 | Zinke | 239/655 |
| 3,272,358 | 9/1966 | Thompson | 198/190 X |

FOREIGN PATENTS

| 340,379 | 1/1931 | Great Britain | 138/39 |
| 544,450 | 6/1956 | Italy | 111/14 |
| 871,261 | 6/1961 | Great Britain | 239/655 |

*Primary Examiner*—Clyde I. Coughenour
*Attorney*—Cushman, Darby & Cushman

ABSTRACT: A method and apparatus for sowing seeds and fertilizers is provided wherein the material to be distributed is carried pneumatically from a source to supply to the point of distribution. A device is provided for pneumatically conveying the material to be distributed, and also, a metering or measuring device may be combined with the pneumatic conveying system for uniformly distributing seed, fertilizer, or any other material. Further, the system provides for carrying the bulk of the material to be distributed on a tractor or other vehicle so that lightweight implements may be combined to assist in the distribution of the material and its ultimate mixing into the earth. The method includes the steps of moving seed or fertilizer from a central source of supply by means of an air stream, and then, spreading the material by a conveyor among several distributor heads and ultimately to implements which serve to mix the material into the earth.

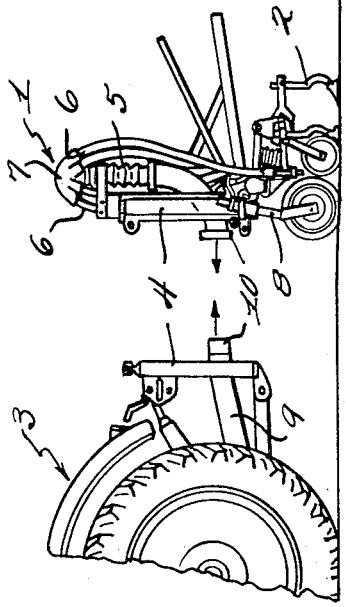
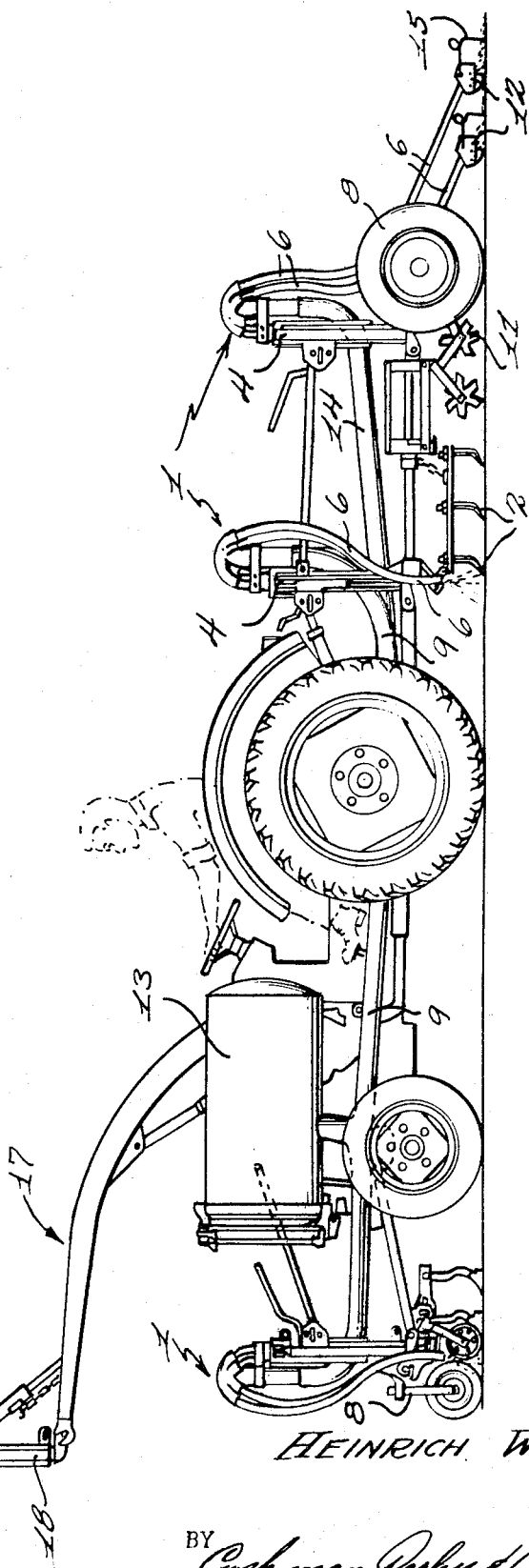

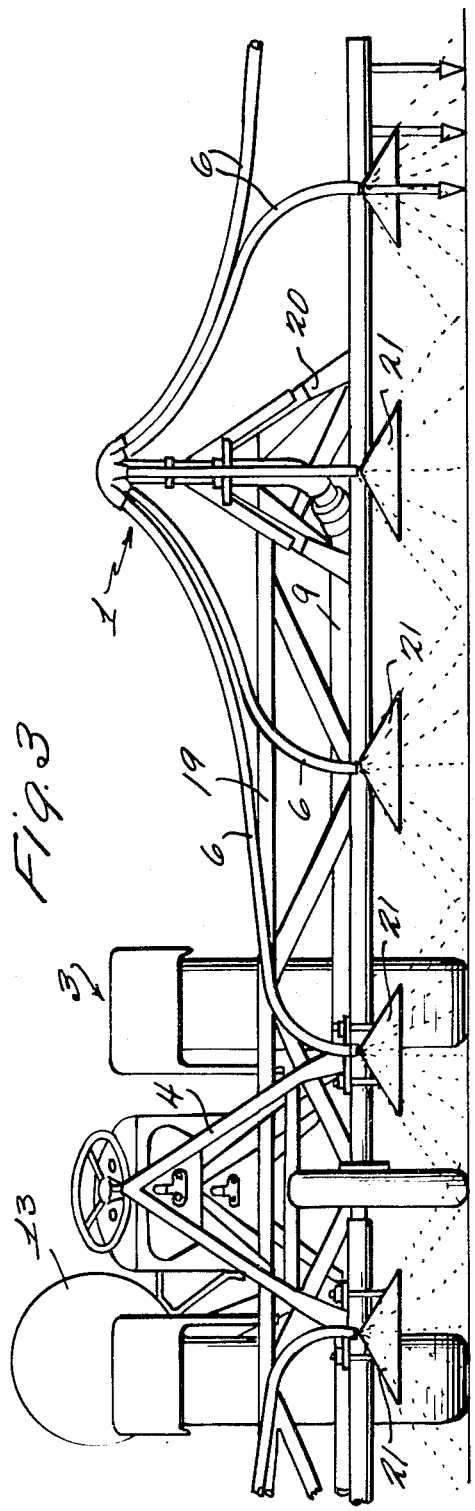
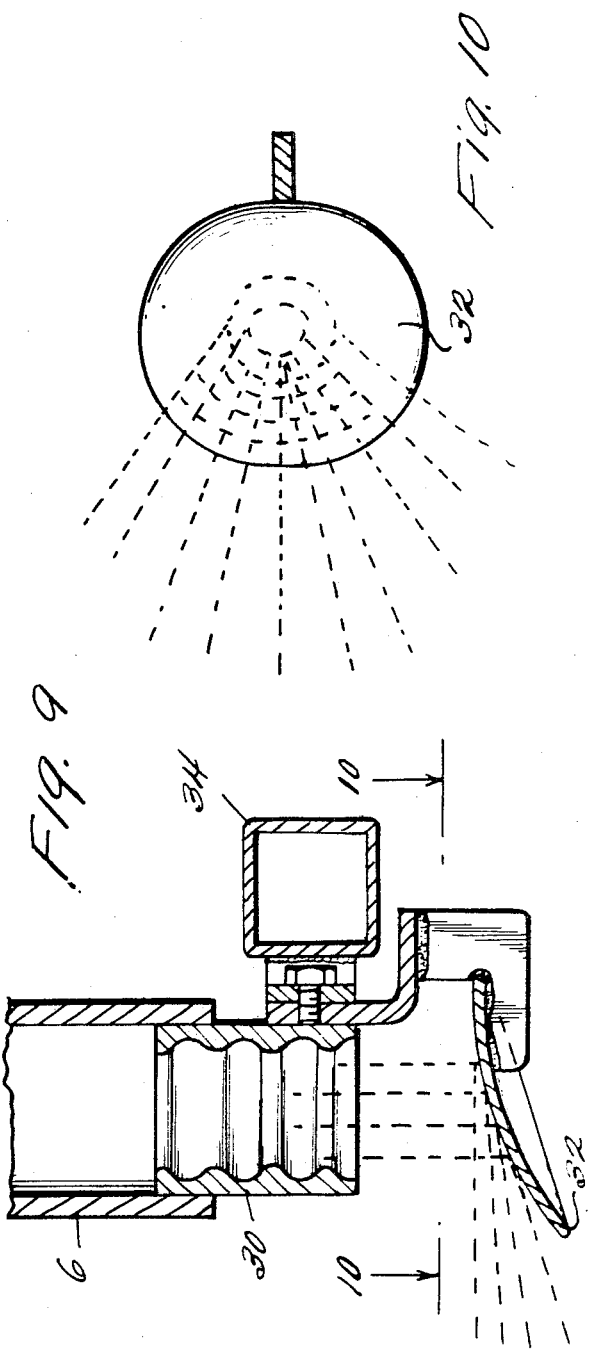

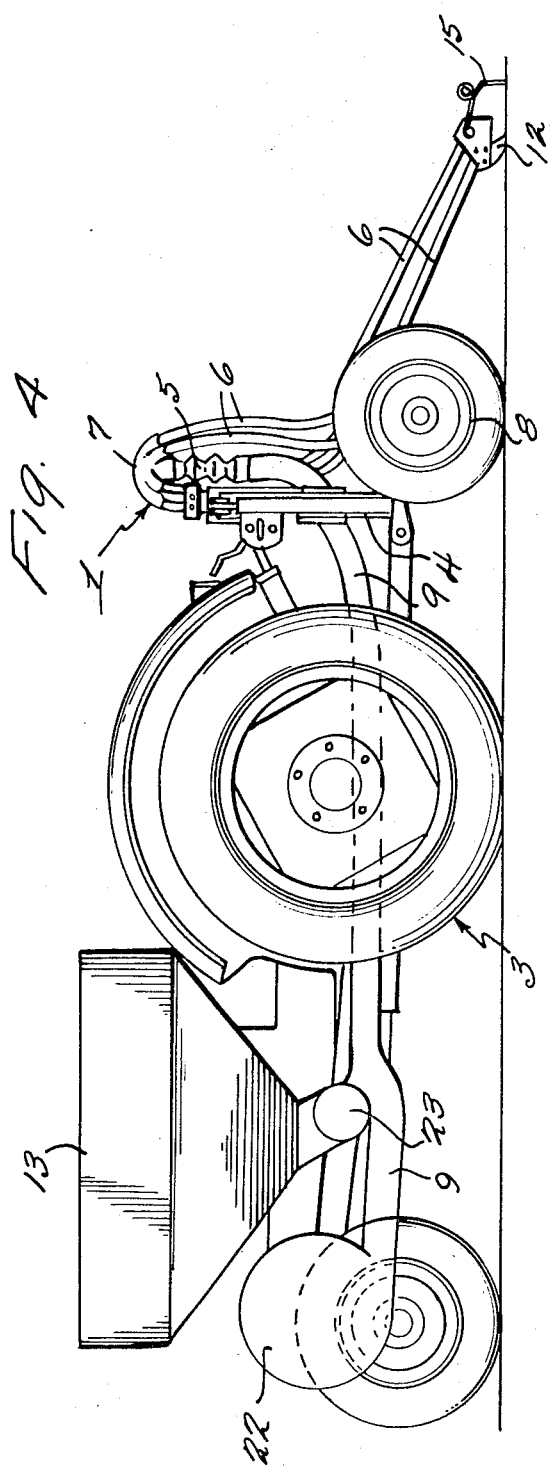
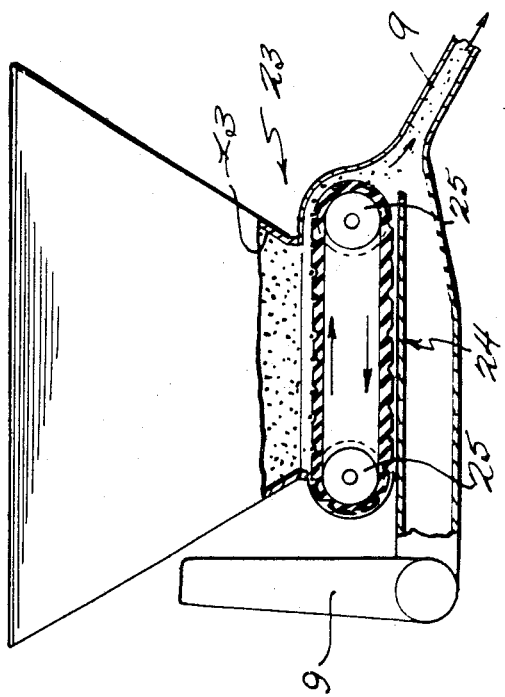

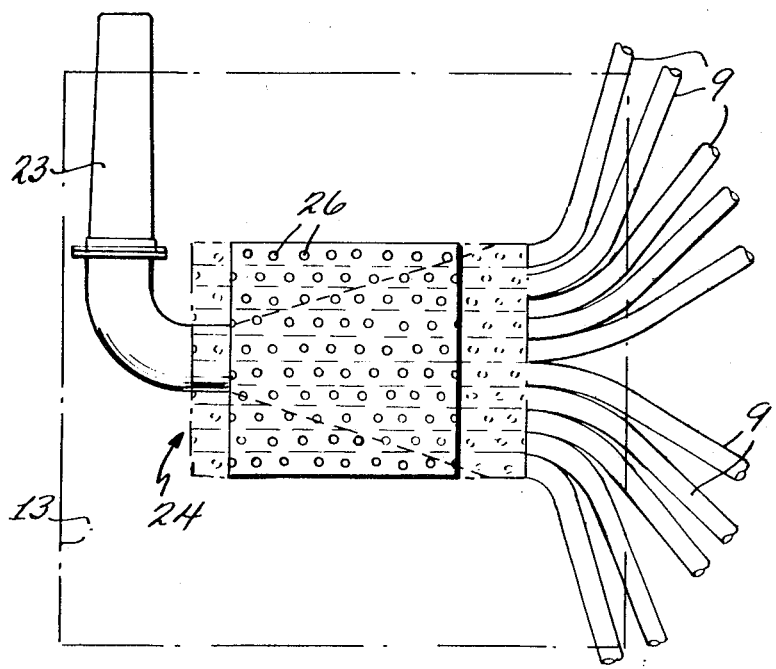
Fig. 6
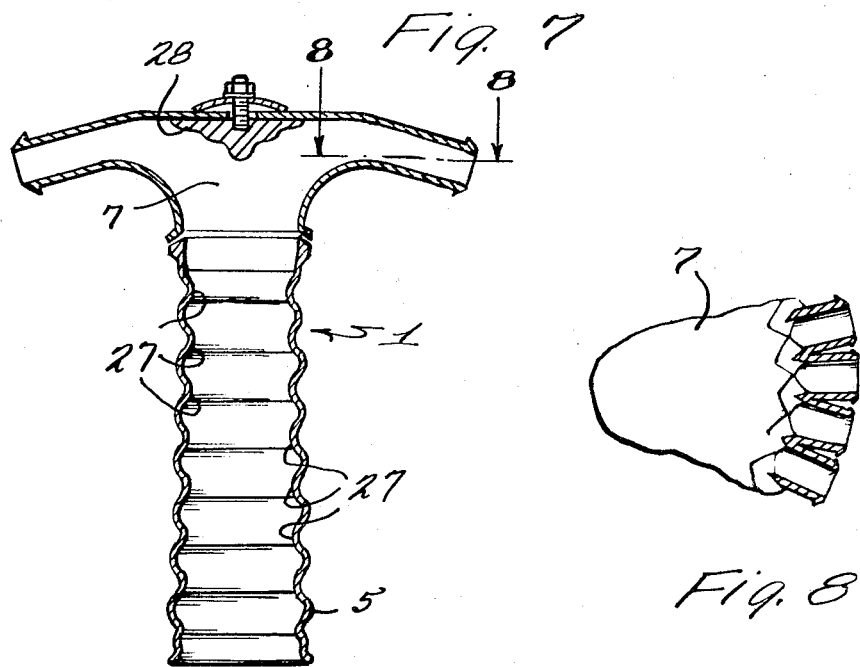
Fig. 7
Fig. 8
INVENTOR
HEINRICH WEISTE
BY Cushman, Darby & Cushman
ATTORNEYS

APPARATUS FOR DISTRIBUTING AND SPREADING MATERIAL

BRIEF DESCRIPTION OF INVENTION

This invention relates to improved apparatus and a method for spreading or distributing seeds and fertilizers on the earth, and in particular, the improved apparatus is directed to a pneumatic system for conveying such materials from a central source of supply to a plurality of distributors associated with earth working implements.

It is well known in the art to use various types of sowing machines and systems for spreading seeds or fertilizers on a field, and in the usual system, materials are dropped onto the earth by tubes, which may be telescoping, and the seeds or fertilizers simply fall by gravity from a container, through the tubes, and into the soil or earth. In such prior art machines, it has been the practice to carry the seed or fertilizer load on the spreading or distributing device which is being utilized for feeding the material into the soil. This load requirement for such machines and implements makes their use and handling more difficult, especially when several such implements are connected together (such as combining seed sowing machines with fertilizer spreaders) in order to carry out several work processes simultaneously. Also, these difficulties arise whenever the sowing machines and fertilizer spreaders are mounted onto earth working devices. This means that it is possible to utilize trains of such implements in limited numbers only. In recent years, heavier tractors and other draft vehicles are being utilized, and it would be desirable to draw larger numbers of seed sowing and fertilizer spreading implements with such heavy tractors. However, the problems of putting together trains or implements having separate heavy loads of their own can be solved only with the use of special pulleys and other auxiliary devices which are needed to handle the trains of heavy implements.

The present invention provides for a system of sowing seeds and spreading fertilizer wherein the particular devices which are used for sowing and spreading are relieved of the full loads of seed and fertilizer. The invention provides apparatus in the form of a central container which can carry a source of seeds or fertilizers on the tractor vehicle itself. The material which is carried in the container is fed through one or more conveying tubes which utilize air pressure to assist in the moving of material to one or more distributor units connected to the tractor vehicle. The distributor units then carry the material through a plurality of flexible hoses which are arranged to carry the material to points of deposit on or in the soil. The flexible hoses may terminate in combination with earth working implements, such as cultivating or sowing shares. With the system of the present invention, it is possible to carry all required loads of seed, fertilizer, water, or even pesticides, on a tractor vehicle and then to feed the loads through hoses to any desired distributing or spreading implements.

The distributor units which receive material from central containers may include coupling means for being easily attached to fore and aft positions on a tractor, and various hoses or conduits of the distributor units may include couplers so that the hoses can be coupled to corresponding hoses on the tractor when the distributor units are coupled thereto. By placing the loads of seeds, or other materials on the tractor, the distributing units and implements are relieved of substantial weights, and therefore, can be easily put together in interchangeable combinations in any desired pattern or arrangement. Further, the coupling operations can be accomplished from the driver's seat of the tractor with normal hydraulic lift devices associated with tractors. In this manner, it is not necessary to utilize external forces and devices to manipulate and handle, what would otherwise be very heavy, implements when it is desired to make up a train of combined implements.

The material which is to be spread from the central container is carried along by pneumatic pressure through conduits and to a distributor head unit which is coupled to the tractor. The pneumatic pressure may be provided by an air compressor which is carried on and operated by the tractor, but of course, the compressor unit may be carried on an implement to be coupled to the tractor, as well. It has been found that harvester units, of known construction, can be readily adapted to the requirements of the present invention since the known harvester units already include containers and compressors.

A further feature of the present invention resides in a measuring or metering device which may be associated with a central container carrying a source of grain or fertilizer which is to be distributed. The measuring device is preferably arranged along a bottom opening of the central container, and a moving air stream is brought into communication with the measuring instrument so that uniform quantities of material can be measured from the central container and then moved by the air stream to distributors. The measuring device may be regulated so as to provide adjustments of uniform quantities of material which are to be deposited.

A further feature of the present invention resides in an improved construction for a distributor pipe associated with a distributor head unit. It has been found that one of the difficulties of conveying bulk materials by means of a moving air stream is the occurrence of obstructions which build up in the conduit systems and cause a nonuniform conveyance of material through a particular conduit. Accordingly, it is desirable to maintain a continuous movement and distribution of material so that none of the material is building up into an obstruction in any part of the device. The improved distributor pipe of the distributor unit includes a rippled or corrugated interior surface which causes conveyed material to be continuously moved along. The continuous movement of individual seed grains or particles of fertilizer is apparently a result of individual particles striking and bouncing from the corrugations and ripples which are provided, and thus, there is a continuous movement of the material in a uniform distribution across an entire cross section of the distributor pipe or unit, and there is no build up of obstructing material in any portion of the distributor pipe and unit. Essentially, the provision of corrugations or ripples is one of constructing angular surfaces within the unit, and such surfaces may be provided wherever it is desired to promote a continuous movement of material and where there is a possibility of material becoming deposited or collected as an obstruction.

The invention also eliminates a requirement for costly telescoping feed tubes by arranging flexible hoses in close proximity to sowing shares or other earth working implements, and it is contemplated that separate hoses for seed and fertilizer may be connected to a single share so as to sow and spread the materials simultaneously.

Finally, a baffle plate construction is provided in an alternative embodiment for use in combination with distributor hoses in place of a sowing share or other earth working implements. The baffle plate is constructed to receive and distribute coarse material and to cause the material to bounce off from the plate and to rebound evenly in various directions over the surface of the soil.

These and other features of the present invention will become apparent in the more detailed discussion which follows and in that discussion reference will be made to the accompanying drawings, in which:

FIG. 1 is a side elevational view of a fertilizer spreader of this invention;

FIG. 2 shows a combination of implements in side elevation;

FIG. 3 shows a combination of implements viewed from an end elevation;

FIG. 4 shows a combination similar to FIG. 2;

FIG. 5 shows a measuring or metering device in cross-sectional elevation;

FIG. 6 is a top plan view of the device of FIG. 5;

FIG. 7 shows a distributor pipe for the distributor unit in cross-sectional elevation;

FIG. 8 shows the distributor pipe of FIG. 7 in partial section on line 8—8 of FIG. 7;

FIG. 9 shows an improved fertilizer spreader in cross-sectional elevation; and

FIG. 10 shows the fertilizer spreader of FIG. 7 as viewed from the top.

DETAILED DESCRIPTION OF INVENTION

Referring to FIG. 1, there is shown a typical combination of implements which includes a distributor unit 1 in accordance with the present invention, a cultivator unit 2 and a tractor vehicle 3. The distributor unit 1 may include any well-known coupling arrangement for being received and coupled to the tractor and a coupling device 4 is shown which is described in greater detail in my copending application Ser. No. 437,054, filed Mar. 4, 1965, now U.S. Pat. No. 3,306,630. The distributor unit 1 includes a vertical distributor pipe 5 which receives material being conveyed from a source of supply located on the tractor. The material is conveyed pneumatically and the distributor pipe 5 includes corrugations on its inner surfaces to assure a continual movement with no obstructions of material within the distributor unit. The distributor unit 1 also includes a plurality of distributor hoses 6 which branch out from a head portion 7 of the unit. As many hoses 6 as are desired may be provided in a particular construction. Although it is only necessary that the distributor unit 1 include a distributor pipe and head means, a plurality of hoses, and means for coupling the unit to a tractor, there may be provided, as shown in FIG. 1, a carriage arrangement 8 which can be attached to the unit for the purpose of carrying the cultivator 2 or any other implements in combination with the unit. A main conduit or feed pipe 9 is shown as being carried along side of the tractor 3 for conveying material into the distributor unit 1. A coupling may be provided for the conduit 9 at the point 10 so that the conduit can be automatically disconnected and connected when the distributor unit 1 is removed from or coupled with a tractor 3.

FIG. 2 illustrates in greater detail the system of the present invention and shows a typical combination of implements and distributor units 1 which can be accomplished by the present invention. For example, a cultivator 2, a crumbler or crusher 11, and sowing shares 12 may be linked up in a train in trailing positions behind a tractor vehicle. Also, each of the distributor units 1 may be coupled to successive units or to the tractor by simply providing framing means which carry the separate coupling devices 4. In a similar fashion, a frame may be mounted to a forward end of the tractor for carrying a coupling device 4 which can receive a distributor unit 1 in a forward position of the tractor. Of course, it is understood that many desired interchanges of combinations may be made, and the illustrated embodiment is by way of example only. In the illustrated embodiment for FIG. 2, the main conduit 9 is connected to receive fertilizer from a central container 13 which is mounted on the tractor vehicle in any suitable manner. Material is withdrawn from the container 13 by means of compressed air which is flowing through the main conduit 9, and any conventional pressure means may be provided for introducing air into the conduit 9. From the conduit 9, the fertilizer is conveyed through the first distributor unit 1 located behind the tractor, and fertilizer then is spread from terminal ends of the separate hoses 6 at points just forward of the cultivator device 2. The separate main conduit 14 conveys seeds from a container (not shown) which may be mounted on an opposite side of the tractor, and the seeds are conveyed from the container by a stream of air moving through the conduit 14 and to the seed distributor unit 1 which is shown in a trailing position behind the tractor. From there the seeds may be carried through separate hoses 6 to sowing shares 12 which are constructed to carry the terminal ends of the separate hoses and to deposit the seeds in shallow furrows formed by the sowing shares 12. Means associated with the sowing shares, such as wire devices 15, function to cover the rows of seeds which have been deposited in the furrows.

FIG. 2 also shows a front loader attachment 17 which may be connected to the tractor in any well-known manner, and the front loader attachment may include a coupling device 18 which is adapted to connect with whatever coupling devices 4 are being utilized with the distributor units and other implements. Thus, the front loader 17 may operate to assist a driver in arranging a combination of distributor units and implements.

FIG. 3 illustrates an example of a combination of implements which can be added laterally from each side of a tractor through the use of a bridging frame 19 which carries a number of coupling members 20 of the type described in my copending application Ser. No. 437,054, now U.S. Pat. No. 3,306,630. The bridging frame 19 is connected to portions of the tractor vehicle in any suitable manner, and then, additional distributor units 1, and other implements, can be connected to the coupling elements 20 of the bridging frame. The coupling elements 20 may be mounted on portions of whatever implements are to be attached, and the distributor units 1 may be then mounted onto the various implements. FIG. 3 also illustrates a type of cone shaped baffle plate 21 which may be provided at terminal ends of the flexible hoses 6 for effecting a better distribution of material over the surface of the ground. Of course, the arrangement shown in FIG. 3 is by way of example only, and other arrangements may be made, as desired.

FIG. 4 shows a typical arrangement for spreading fertilizer and sowing seeds simultaneously with a share element 12 which includes an element 15 for covering a row of seeds. The separate hoses 6 may separately carry fertilizer and seed from separate central containers, as discussed with reference to FIG. 2. FIG. 4 further illustrates a typical compressor installation at 22. Further, there is provided a metering or measuring device 23 which cooperates with the central container in a manner which will be discussed with reference to FIGS. 5 and 6. As with the FIG. 2 illustration, one central container 13 has been omitted from the drawing, but it is contemplated that two separate containers will be mounted on a tractor vehicle when it is desired to simultaneously spread fertilizer and seeds. With the arrangement shown in FIG. 4, fertilizer and seeds are distributed from separate containers by separate metering devices 23, and then carried by a flow of air through separate main conduits and to distributor units 1. A separate distributor unit (not shown, but mounted laterally of the first unit as described in FIG. 3) receives and distributes material from the second central container for delivery to the earth.

FIGS. 5 and 6 illustrate a measuring or metering device 23 which is useful in providing an even delivery of seeds and fertilizer to the distributor unit 1. In the embodiment shown, a conveyor belt 24 is mounted to be revolved in reversing directions about the rollers 25. The rollers 25 may be driven from a power source on the tractor in any well-known manner. When the conveyor belt 24 is rotated in the direction shown by the arrows, individual seeds will fall into indentations 26 formed on the surface of the conveyor belt. The seeds will be carried out of the central container 13 until they are picked up in a compressed airstream which is being produced by compressor 22 and which flows past the conveyor 24 so as to be in communication therewith. From there the seeds may be conveyed into a main conduit so as to distribute as discussed for FIGS. 1 through 4, but alternatively, the seeds may be delivered to separate hoses. It should be apparent that the conveyor belt 24 normally forms a closure to the bottom of container 13, and material is dispensed from the container only when the belt is rotated. In a preferred embodiment of a metering or measuring device, the belt 24 is made up of a plurality of single belts as shown in FIG. 6, and each separate belt has indentations 26 for receiving seeds and other material which is to be distributed out of the container 13. By forming the conveyor belt 24 from separate elements, it is possible to convey uniform quantities of material into separate conduits, as shown in FIG. 6. The separate conduits 9 may carry material into corresponding separate units 1 or directly to hoses which terminate near the soil, as desired. Further, when the belts are arranged as shown in FIG. 6, there may be provided guide plates between each separate belt and within the confines of the bottom portion of the container 13 so as to guide material to the individual belts. The conveyor belt may be made of rubber material, or any similar material, and when the material is resilient, the indentations 26 will change their form slightly as they move about the rollers 25. This action causes the indentations to automatically release any seed or material which is compacted within the individual indentations. It is also contemplated that the supply container, compressor means, and measuring device may be combined into a single unit which is attachable to a tractor.

FIGS. 7 and 8 illustrate a detailed portion of the distributor unit 1 which forms a part of the present invention. The vertical pipe portion 5 of each distributor unit is preferably formed to include corrugations or ripples on its inner surfaces, as shown at 27. The purpose in providing corrugations within the distributor units resides in an unexpected and improved result which is obtained by keeping all particles of material in continual motion while they are being conveyed in an air stream. It has been found that the provision of angular projections on a surface, such as the ripples 27, assists in the continual movement of all particles, and therefore, the problem of material accumulation within the distributor is essentially eliminated. A head portion 7 for the distributor unit may likewise include a corrugated plate 28 which further assists in maintaining particle movement through the entire unit. Further, as shown in FIG. 8, the inner surfaces of the distributor unit at the points where individual hose lines are received into the unit may be formed with sharp angular projections to maintain a movement of material through and out of the distributor unit. Also, it is contemplated that corrugations may be provided at any other point in the distribution system, and it is desirable to provide corrugated pipe sections at the terminal ends of each of the flexible hoses 6 to assure an even dispensing of material from the ends of hoses.

FIGS. 9 and 10 illustrate a baffle plate or spreader structure which may be combined with the flexible hoses 6 to assure an even distribution of material from the end of the hose. In the arrangement shown in FIG. 9, a hose 6 includes a corrugated pipe section 30 which assists in a movement of material through the end of the hose, and a baffle plate 32 is mounted at a predetermined distance beyond the terminal end of the hose. The baffle plate 32 and the terminal end of the hose may be adjustably mounted relative to a frame portion 34 associated with an implement, and the baffle plate 32 is formed with a convex upper surface for distributing particles of material. FIG. 10 illustrates a particular plan of distribution of particles striking a baffle plate.

Although the invention has been described with reference to specific embodiments, variations will become apparent to those skilled in the art, and such variations are intended to be included within the scope of this invention.

What is claimed is:

1. In apparatus of the type in which seed or other material is conveyed by an airflow from a central container to a distributor unit means having a plurality of flexible hoses which distribute the material to the ground, the improvements comprising:

said central container being mounted on a tractor or other vehicle for holding a supply of material to be distributed, and said central container being unpressurized during normal dispensing operations, a measuring or metering means associated with said central container for removing uniform quantities of material from the container, a source of compressed air carried on said tractor separately from said central container for conveying material from the central container through a conduit means which communicates between the source of compressed air, the central container, and the distributor unit means, said conduit means including a vertically disposed pipe portion which carries material upwardly to a head portion of the distributor unit means for distributing the material to said plurality of flexible hoses, said vertically disposed pipe portion having a corrugated or rippled inner surface for assuring uniform distribution of said material to said head portion of the distributor unit, said distributor unit means being separated from said central container so that it can be carried on a separate trailer means or other means which can be coupled and decoupled from said tractor, a trailer means for carrying said distributor unit means, and a coupling means in the form of a pair of cooperating triangular frames, at least one of which is carried by said tractor for coupling and decoupling the distributor unit means and its separate trailer relative to the tractor.

2. The apparatus of claim 1 wherein said trailer means includes agricultural earth working implements.

3. Apparatus as in claim 1 wherein said measuring or metering means comprises a conveying belt positioned across an opening in the bottom of said container, said belt being driven by a pair of rollers for conveying material out of said container and into one or more flow paths.

4. The apparatus of claim 3 wherein said belt includes spaced indentations on its surface for receiving measured quantities of material for removal from said container.

5. The apparatus of claim 3 wherein said belt is made up of a plurality of separate belt elements which can separately deliver quantities of material to separate conduits.

6. The apparatus of claim 5 wherein said belt is made from a resilient, rubberlike material.

7. The apparatus of claim 3 wherein said container, source of compressed air, and measuring means are assembled as a single unit.

* * * * *